INVENTOR
THOMAS W. HEERMANS

BY

ATTORNEYS

Oct. 30, 1962 T. W. HEERMANS 3,061,223
RAPID WIND MECHANISM FOR CAMERAS
Filed Dec. 10, 1958 5 Sheets-Sheet 2
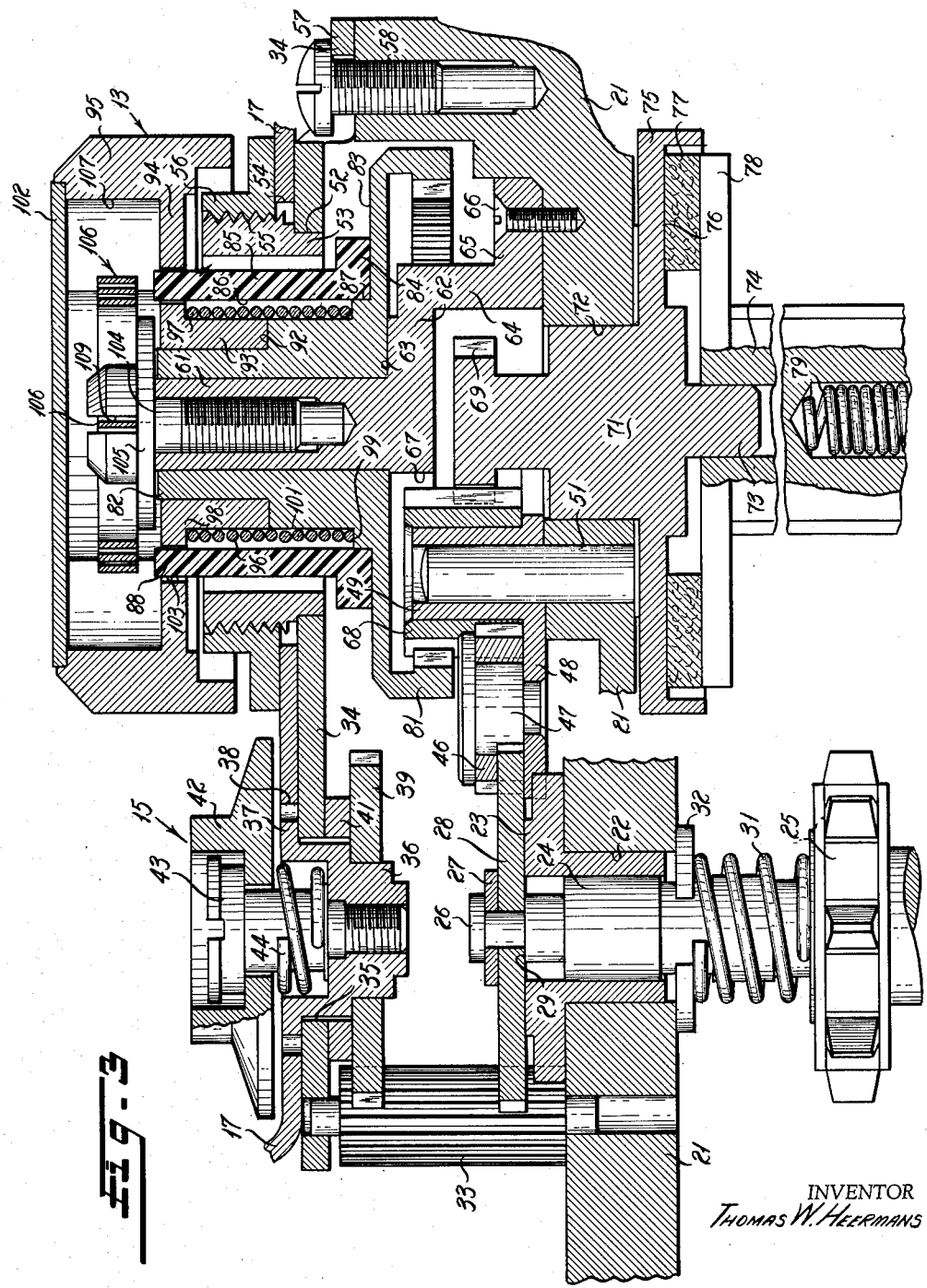
INVENTOR
Thomas W. Heermans
BY
Strauch, Nolan & Neale
ATTORNEYS

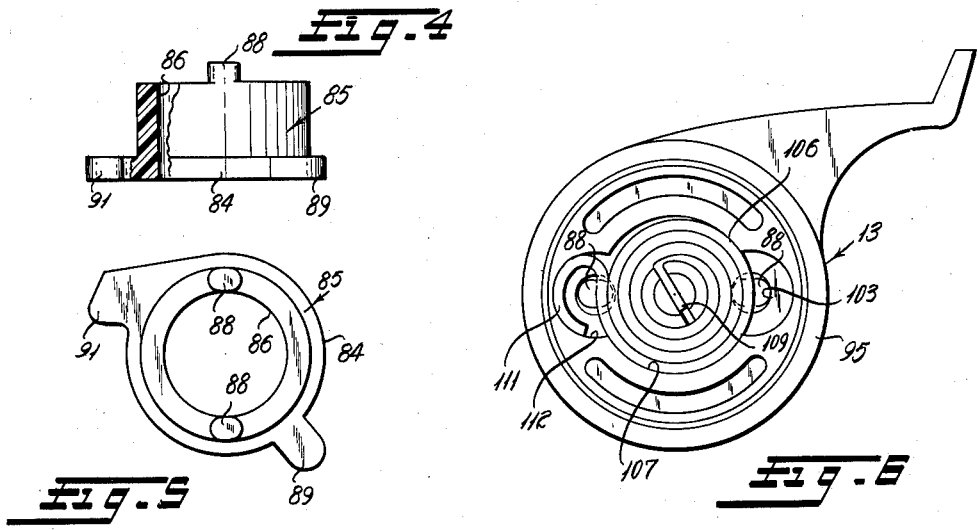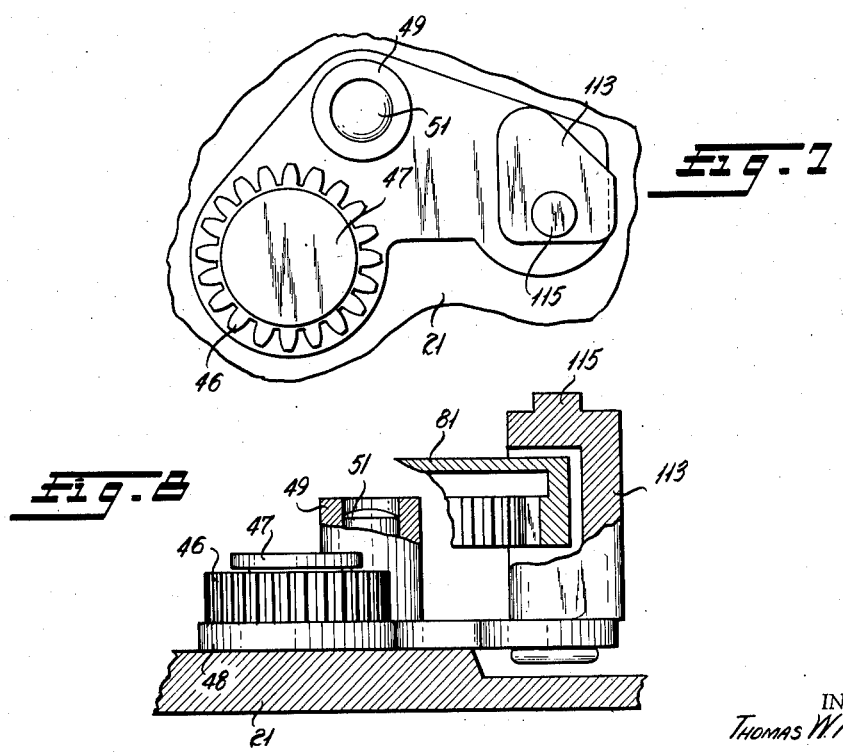

INVENTOR
Thomas W. Heermans

BY
ATTORNEYS

United States Patent Office 3,061,223
Patented Oct. 30, 1962

3,061,223
RAPID WIND MECHANISM FOR CAMERAS
Thomas W. Heermans, Ypsilanti, Mich., assignor, by mesne assignments, to Argus Incorporated, a corporation of Delaware
Filed Dec. 10, 1958, Ser. No. 779,435
18 Claims. (Cl. 242—71.4)

This invention relates to cameras and particularly to mechanism for rapidly winding film following an exposure.

The present invention in its preferred embodiment provides at the take-up spool of a 35 mm. or like camera a special rugged rapid wind construction whereby two quick strokes of a manual lever in one direction act to rotate a film advancing sprocket and the take-up spool to rapidly wind film upon the spool after an exposure has been made, and wherein movement of the lever in the opposite direction disconnects the drive to the film advancing sprocket so that exposed film may be reeled back upon the original supply spool.

It is the major object of this invention to provide a camera having a novel rapid wind mechanism for advancing the film after each exposure.

A further object is to provide a rapid wind mechanism that includes a novel arrangement for disabling the take-up spool drive in a camera for rewinding exposed film back into a cartridge or the like.

Another object of the invention is to provide in a camera a novel rapid wind mechanism that includes a special high speed gear drive to a film advancing device.

It is a further object of the invention to provide a novel rapid wind mechanism in a camera wherein a wind lever is connected to the take-up spool by a concentric one-way clutch and a special stop sleeve limiting rotation of the lever is coupled to the lever.

A further object of the invention is to provide a novel camera mechanism wherein film advancing means is drive connected to the take-up spool rotating means by gearing mounted on a carrier that is swingable to interrupt that drive.

It is another object of the invention to provide novel camera drive gearing wherein an internal ring gear drives a planet gear operably connected to a film advancing sprocket and a take-up spool, and a wind lever actuates said internal gear to drive the sprocket and spool when rocked in one direction and operates to disconnect the sprocket drive when rocked in the other direction.

Further objects of the invention will appear as the description proceeds in connection with the appended claims and annexed drawings wherein:

FIGURE 3 is an enlarged section essentially along line 3—3 of FIGURE 2 showing the details of the rapid wind mechanism;

FIGURES 4 and 5 are side and top plan views of the stop sleeve that turns with the rapid wind lever;

FIGURE 6 is a top plan view of the wind lever with its cover removed to show the return spring;

FIGURE 7 is a side elevation of the carrier and some associated parts, partly in section;

FIGURE 8 is a top plan view of the carrier; and

Figure 2:
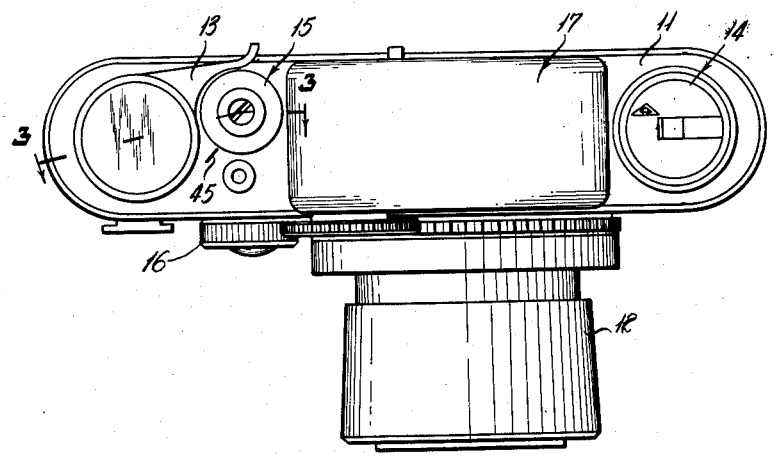

The camera comprises a body 11 having a lens 12 mounted on its front wall in front of an exposure aperture over which the film is drawn from a supply cartridge or the like to a take-up spool. The supply cartridge and take-up spool are not shown but are disposed on parallel axes within the camera. Referring to FIGURE 2, the take-up spool is rotated by a rockable lever 13, the film is rewound onto the cartridge by a rewind lever assembly indicated at 14, and a counter 15 is visible. The lens 12 is focused by rotating a suitable knob 16 geared to the lens barrel and operably connected to the view finder within cover 17 and having front windows 18 and 19. In general the internal structure of the camera, apart from the rapid wind mechanism to be described, is preferably the same as shown in U.S. Letters Patent No. 2,655,847 issued to James E. Harvey October 20, 1953.

Referring now to FIGURE 3, the camera body has an internal upper wall 21 housed by cover 17, and wall 21 is formed with an opening 22 for receiving a bushing 23 in which is journalled the upper end of shaft 24 of sprocket 25. At its upper end shaft 24 is formed with a flange 26 seating against a split retainer washer 27 that holds sprocket drive gear 28 against shaft shoulder 29. A spring 31 reacting between a washer 32 backed by wall 21 and the sprocket shaft maintains the assembly biased downwardly in FIGURE 3.

Gear 28 is meshed with a counter idler gear 33 journalled at opposite ends in wall 21 and a fixed bracket plate 34 secured rigid with wall 21 by fasteners not shown. Bracket plate 34 is apertured at 35 to rotatably receive a short counter shaft 36 having a flanged upper end at 37 disposed in cover aperture 38 and bearing on the top of plate 34.

A gear 39 is fixed on shaft 36 and meshed with idler 33, and a spacer 41 is interposed between gear 39 and the bottom of plate 34. An indicator dial 42 is mounted on shaft 36 as by screw 43 and compression spring 44. This insures that dial 42 normally turns with shaft 36, but the frictional drive connection between dial 42 and shaft 36 enables the dial to be rotated relative to the index line 45 (FIGURE 2) without rotating shaft 36.

Sprocket drive gear 28 is also meshed with an idler gear 46 rotatably mounted on a stud 47 upstanding from a carrier plate 48 that is journalled by hub 49 on a smooth pin 51 fixed to and upstanding from wall 21.

Bracket plate 34 is apertured at 52 to receive the shouldered end of a short hollow sleeve 53 that projects up through cover aperture 54 and is externally threaded at 55. A nut 56 is threaded onto sleeve 53 and when drawn tight clamps cover 17 against plate 34 and secures sleeve 53 tightly to plate 34. At its outer end plate 34 has a depressed flange 57 secured to wall 21 as by screws 58.

A cylindrical post 61 has an intermediate flange 62 formed with a substantially annular flat bearing face 63 normal to its axis and a skirt 64 depending from the flange has an external flange 65 seated upon and secured as by screws 66 to wall 21. Thus post 61 is fixed to the camera body. Flange 62 is recessed at one side at 67 to provide a space about planet gear 68 which is journalled upon carrier hub 49.

Planet gear 68 in turn is meshed with sun gear 69 fixed on a shaft 71 journalled in wall 21 at 72 and having a pilot projection 73 fitting into the film take-up spool assembly indicated at 74. The lower end of shaft 71 is a shallow cup-shaped flange 75 having a friction surface 76 engaged by an annulus of friction material 77 secured on the end flange 78 of the spool 74, and this friction clutch assembly is maintained engaged as by an axial compression spring 79.

Axially seated in thrust bearing engagement on surface 63 is an internal ring gear 81 meshed with gear 68. The hollow hub 82 of ring gear 81 is journalled on post 61 and is substantially coextensive with the post.

Ring gear 81 has a flat annular upwardly facing surface 83 normal to its axis and seated on surface 83 is the flat surfaced lower flanged end 84 of a cylindrical stop sleeve 85. The internal cylindrical bore 86 of sleeve 85 is journalled with a bearing fit on cylindrical shoulder 87 of the ring gear. At its upper end sleeve 85 is formed with diametrically opposed upstanding edge lugs 88 (FIGURE 4). Referring to FIGURE 5 flange 84 is formed with a radially outward stop projection 89, and substantially diametrically opposite thereto a radially projecting nose 91, the purpose of which will be described. Sleeve 85 is preferably an integral molded element of nylon or like plastic having good wear and friction-free properties.

The ring gear hub is shouldered at 92 for seating the hollow hub 93 depending from web 94 which extends across the circular end rim 95 of lever 13. A coiled spring 96 extending axially between a shoulder 97 on hub 93 where the spring is attached to the lever at 98 and a shoulder 99 at the lower end of cylindrical hub portion 101 which is freely encircled by the spring. This provides a uni-directional clutch connection between lever 13 and gear 81. When lever 13 is rocked counterclockwise in FIGURE 2 the coiled spring 96 wraps around hubs 93 and 101 so that gear 81 is driven thereby, and when lever 13 is oppositely rocked the spring effectively uncoils to lose its motion transmitting connection with gear 81 which is not rotated thereby.

FIGURE 6 is a top plan view of the lever 13 with closure cap 102 removed to show the diametrically opposed apertures 103 in web 94 that receive lugs 88 and thus directly couple lever 13 to sleeve 85.

At its upper end stationary post 61 has a threaded bore to receive a screw 104 that clamps washer 105 tight upon the top of the post. Washer 105 clears the upper end of the ring gear hub and the lever hub but retains those parts against material axial displacement.

A lever return spring 106 is provided within the recess 107 in the lever rim. Spring 106 has one end disposed in slot 109 of the screw head and its other end 111 (FIGURE 6) is formed to be trapped in pocket 112 of the lever to move with the lever. Thus when lever 13 is moved counterclockwise in FIGURE 2 it winds spring 106, and that spring returns the lever to initial position upon completion of the stroke when the operator lets go.

Figure 9:
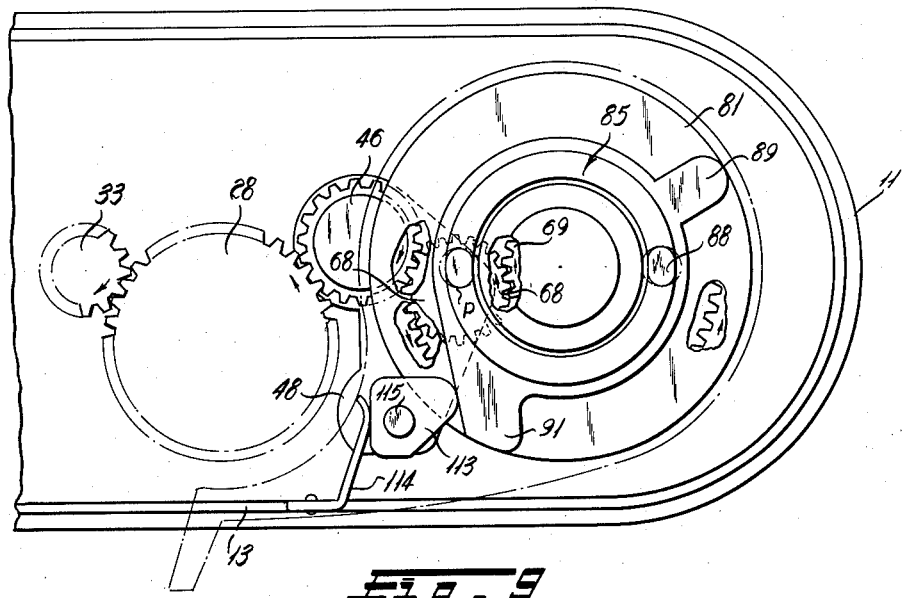
FIGURES 9, 10, 11 and 12 are plan views of the rapid wind mechanism showing the parts in different conditions of operation.

FIGURES 7 and 8 illustrate the carrier 48 and particularly show the rigid cam 113 that is riveted to plate 48 and serves an important dual function in operation. Reference is also made to FIGURE 9 which shows the parts in initial position ready to start winding film onto the spool 74.

Figure 1:
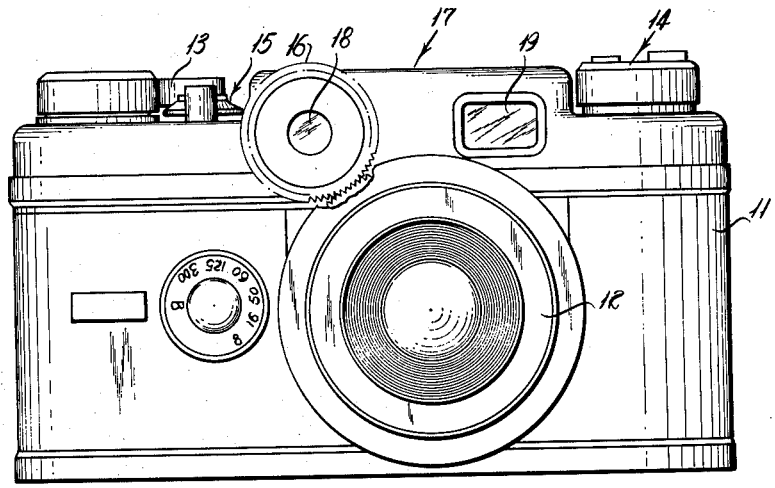
FIGURES 1 and 2 are front and top plan views respectively of a camera incorporating a preferred embodiment of the invention.

Referring to FIGURE 9 the carrier 48, which pivots about the center of gear 68 at the axis indicated at P, is biased to rock counterclockwise by a spring 114. This places gears 46 and 28 in mesh, so that rotation of the lever 13 which turns gear 81 will be transmitted to rotation of the sprocket 25 to advance the film to the right in FIGURE 3 and also actuate the counter. At this time the lever 13 is biased to its FIGURE 1 and 9 position by spring 106 and projection 91 of the sleeve 85 abuts cam 113 as a stop.

Assuming in FIGURE 9 that an exposure has been made and it is desired to advance a fresh frame before the exposure aperture. The camera contains the usual film wind locking arrangement to prevent double exposures as in said Harvey patent, and this is now released to permit film advance.

Figure 10:
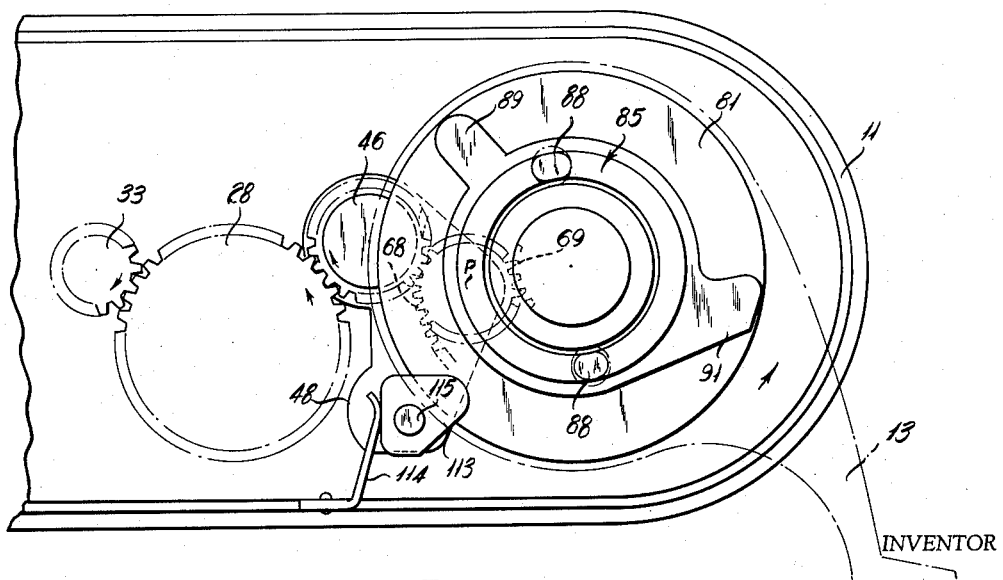
Figure 11:
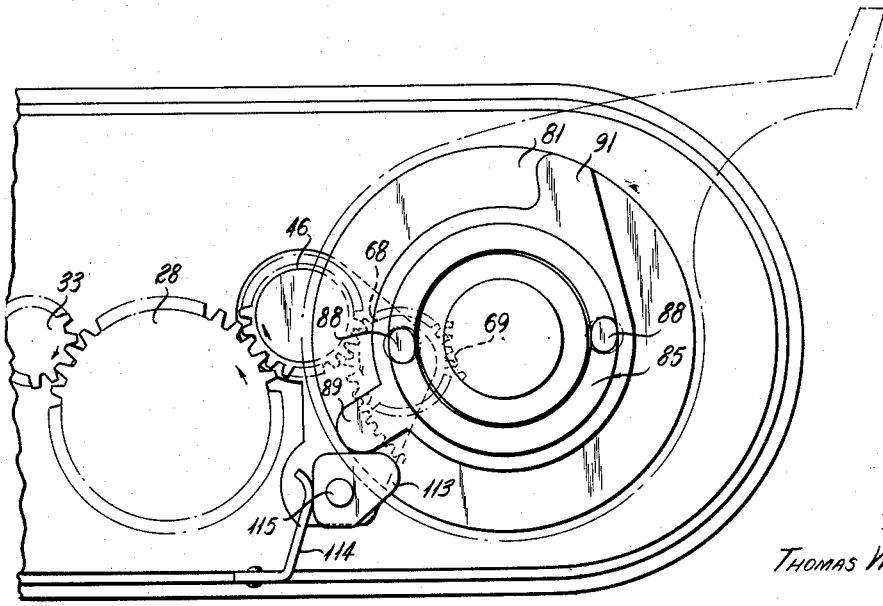

The operator grasps lever 13 and swings it counterclockwise about its axis which is the axis of the take-up spool 74. Sleeve 85 rocks directly with lever 13. FIGURE 10 shows the parts in an intermediate position during such rotation, and FIGURE 11 shows the relationship of parts after about 180° of stroke at which point rocking of lever 13 is prevented by stop projection 89 abutting cam 113. The film is now partly advanced to be wound on spool 74.

Now the operator releases lever 13 which immediately returns to FIGURE 9 position under the urging of spring 106. Then the operator grasps lever 13 to start a second rotary stroke counterclockwise as before. The angular movement of lever 13 however now is governed by the amount of film necessary to be advanced to complete a full frame advance. As in the Harvey patent the sprocket 25, upon turning one complete revolution which measures the exact amount of film advance, controls mechanism that arrests film advance. Thus, depending upon the diameter of the film already wound on reel 74, the angular stroke of lever 13 may be anything short of 180°.

In any event, however, two quick strokes of the lever 13, one about 180° and the other somewhat less, accomplish rapid advance of the film the desired distance and wind it on the reel 74.

Figure 12:
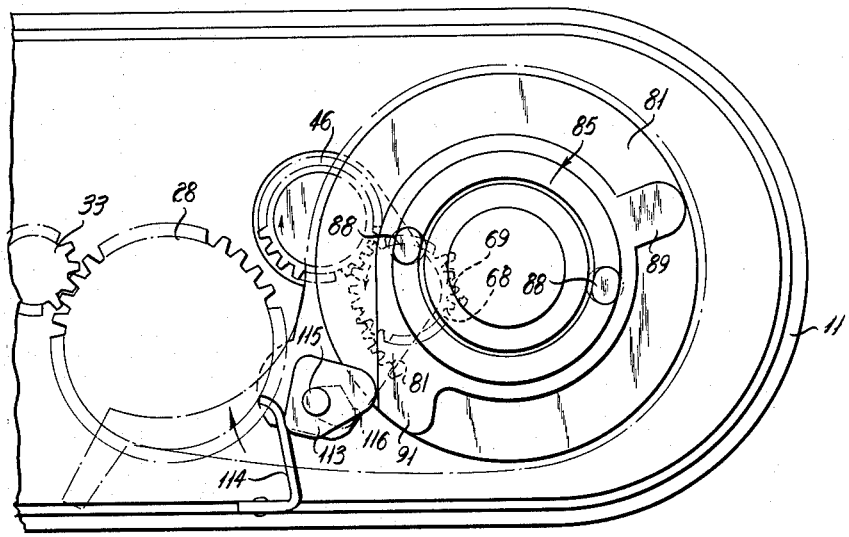

When the film has all been exposed and wound on the reel 74 it is now desired to rewind it into the cartridge at the other end of the camera. At this time the operator grasps the lever 13 and rocks it clockwise so that, as shown in FIGURE 12, nose 91 engages cam 113 to rock the entire carrier 48 about its pivot axis to the FIGURE 12 position where gears 28 and 46 are demeshed. With the parts held in this position, manipulation of the rewinding device at 14 speedily and easily unreels film from reel 74. This declutch of gears 46 and 28 insures that there will be reduced resistance to turning of the sprocket that might interfere with rewind of the film. During rewind the hub 82 of gear 81 turns in the direction in which it is not clutched to the lever by spring 96.

Movement of the carrier in the clockwise direction is limited by engagement of lug 115 on the cam 113 with the edge of a suitable aperture 116 in plate 34 (FIGURE 12).

Release of the lever 13 after all film has been rewound returns the parts to the FIGURE 9 condition.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having a rotatable take-up reel and a rotatable film engaging sprocket, a manually rockable rapid wind lever spring biased to a predetermined initial position, a uni-directional drive mechanism connected between said lever and said reel and including a driven rotatable member, drive means connecting said sprocket to said driven member so that rocking of said lever, in one direction, rotates the sprocket as well as the gear, and means actuated only by rocking movement of said lever, in the opposite direction, from said initial position for interrupting said drive means to the sprocket.

2. In the camera defined in claim 1, said driven member being a gear and said drive means being a gear train adapted to be disengaged when said lever is moved in said opposite direction.

3. In a camera having a film take-up reel, mechanism for rotating said reel in a predetermined direction to wind film thereon following each exposure comprising a manually operable member and a one-way drive clutch that is operable to transmit motion of said member, in one direction, from a predetermined initial position to rotate the reel when said member is rotated in said one direction, resilient means normally biasing said member to said initial position, film advance control means engaged with the film and normally operably drive connected to said mechanism, and means actuated by said member only when said member is moved, in the opposite direction, from said predetermined initial position for disabling said operable drive connection between said member and said control means.

4. In the camera defined in claim 3, said control means comprising a sprocket normally engaged by the film.

5. In the camera defined in claim 3, said drive connection to said film advance control means comprises at least two meshed gears one of which is carried by a swingable mount, and said actuated means comprising means movable with said member adapted to swing said mount to demesh said gears when said member is moved in said opposite direction.

6. In the camera defined in claim 3, said member being rockably mounted and said last-named means comprising a part movable with said member and stop means cooperating with said part when said member is rotated in said one direction for arresting said member after predetermined rotation.

7. In a camera having a rotatably mounted take-up reel and a rotatable drive shaft therefor, unidirectional drive mechanism connected to said shaft, a rockable manually operable lever for said mechanism adapted to rotate said shaft when rocked in one direction, a sprocket adapted to be engaged by the film, means operably drive connecting said sprocket to said mechanism so that the sprocket is rotated when said reel is rotated to wind film thereon, and means actuated by rocking said lever in the opposite direction serving to optionally disrupt said drive connection between said mechanism and said sprocket comprising clutching means in said drive connection to the sprocket and an operator for said clutching means connected to said lever and operable to disengage said clutching means only when said lever is rotated in the direction opposite to that for winding film on said reel.

8. In a camera having a take-up reel and a rotatable drive shaft therefor, a drive gear operably connected to said shaft, a manually operable rockable lever having a one-way drive connection with said drive gear, a sprocket engaged by the film, a sprocket drive gear rotatable with said sprocket, a shiftable gear carrier in said camera, gearing on said carrier providing a drive gear train from said drive gear to said sprocket drive gear, and means rotatable with said lever operable when the lever is rocked from an initial position in the direction opposite to that in which said reel is rotated thereby for shifting said carrier to interrupt said drive gear train to the sprocket.

9. In the camera defined in claim 8, said last-named means being a sleeve rotatable with said lever and having a projection adapted to engage and shift said carrier.

10. In a camera having a rotatably mounted film take-up reel, a shaft operably connected to drive said reel and having a gear, a manually operable lever rotatably mounted on the camera coaxially with said reel, mechanism including a uni-directional clutch drive connecting said lever and said shaft, stop means for arresting rotation of said lever after predetermined angular movement in the direction wherein the clutch connects it to drive said shaft, a spring biasing said lever to an initial position, a rotatable drve gear coaxial with said reel, a rotatable film engaging sprocket having a gear, a pivoted carrier on which are mounted meshed gears, one in engagement with said sprocket gear and the other coaxial with the carrier pivot and in engagement with both the drive gear and said shaft gear, and means movable with said lever for engaging and swinging said carrier to separate said one carrier mounted gear from said sprocket gear when said lever is rocked from said initial position in the opposite direction .

11. In a camera having a rotatable take-up reel drive shaft having a gear, a rotatable internal gear coaxial with said reel, a rotatable sprocket drive gear, a pivoted carrier, a planet gear on said carrier coaxial with the carrier pivot and meshed with both the shaft gear and said internal gear, an idler gear on said carrier constantly meshed with said planet gear, means resiliently biasing said carrier to mesh said idler gear with said sprocket drive gear, and control means for rotating said internal gear to wind film on said reel.

12. In the camera defined in claim 11, means movable with said control means for shifting said carrier to demesh said idler and sprocket drive gears.

13. In a camera having a rotatable take-up reel drive shaft, a drive gear rotatably mounted coaxial with the shaft, a rockbly mounted rapid wind lever, said drive gear and lever having axially adjacent coaxial cylindrical hubs of the same diameter, a unidirectional coil spring clutch surrounding said hubs so that rocking of said lever in one direction correspondingly rotates said drive gear, means providing a drive connection between said drive gear and said shaft, a sleeve surrounding said spring clutch and rotatable with said lever, and coacting stop means on the sleeve and camera for limiting angular movement of said lever, in one direction, from an initial predetermined position.

14. In a camera having a rotatable take-up reel drive shaft, a drive gear rotatably mounted coaxial with the shaft, a rockably mounted rapid wind lever, said drive gear and lever having axially adjacent coaxial cylindrical hubs of the same diameter, a unidirectional coil spring clutch surrounding said hubs so that rocking of said lever in one direction correspondingly rotates said drive gear, means providing a drive connection between said drive gear and said shaft, a sleeve surrounding said spring clutch and rotatable with said lever, coacting stop means on the sleeve and camera for limiting angular movement of said lever, in one direction, from an initial predetermined position, a film engaging sprocket, a drive gear train between said sprocket and said drive gear, and means on said sleeve operable upon angular movement of said lever, in the opposite direction, from said initial predetermined position for interrupting said drive gear train.

15. In a camera having a rotatable take-up reel drive shaft, a drive gear coaxial with said shaft, a rotatable rapid wind lever, said drive gear and lever having coaxial cylindrical hubs, a uni-directional coil spring clutch surrounding said hubs, means providing a drive connection between said drive gear and said shaft, a sleeve surrounding said spring clutch and rotatable with said lever, and coacting stop means on the sleeve and camera for limiting angular movement of said lever in one direction from an initial position, said sleeve having an axially separable connection with said lever and bearing engagement with said drive gear so as to be rotatable with respect thereto.

16. In a camera, a rotatable take-up reel drive shaft, a drive gear mounted for rotation coaxially of said shaft, a wind lever mounted for rocking movement coaxially of said gear, means providing a uni-directional drive connection between said lever and said gear, a positive drive connection between said gear and said shaft, a sleeve rotatably mounted on said gear for movement about the axis of said gear, means drive connecting the lever to said sleeve, and coacting stop means on the camera and sleeve for limiting rocking movement of the lever in the shaft rotating direction.

17. In the camera defined in claim 16, a rotatable film engaging sprocket, a pivotally mounted gear carrier on said camera, gearing including at least one gear on said carrier for drive connecting said drive gear to said sprocket, and means on said sleeve contacting said carrier to move the carrier sufficiently to interrupt drive through said gearing when said lever is rocked in the opposite direction.

18. In the camera defined in claim 17, said coacting stop means comprising a projection on said sleeve and an abutment on said carrier.

References Cited in the file of this patent

UNITED STATES PATENTS

| | | |
|---|---|---|
| 2,025,609 | Nuchterlein | Dec. 24, 1935 |
| 2,057,198 | Marcussen | Oct. 13, 1936 |
| 2,140,445 | Mihalyi | Dec. 13, 1938 |
| 2,241,122 | Drotning | May 6, 1941 |
| 2,246,034 | Elison | June 17, 1941 |
| 2,575,012 | Harvey | Nov. 13, 1951 |
| 2,655,847 | Harvey | Oct. 20, 1953 |
| 2,930,303 | Sago et al. | Mar. 29, 1960 |